United States Patent [19]

Anderson

[11] Patent Number: 4,496,166
[45] Date of Patent: Jan. 29, 1985

[54] TRANSLOTOR LOG TRAILER

[76] Inventor: Clifford W. Anderson, Rte. 1, Box 205-H, Spearfish, S. Dak. 57783

[21] Appl. No.: 360,935

[22] Filed: Mar. 23, 1982

[51] Int. Cl.³ .............................................. B62D 53/06
[52] U.S. Cl. ............................... 280/401; 280/423 A; 414/339; 414/543
[58] Field of Search .................... 280/401, 404, 405 A, 280/423 A, 33, 99 T, 423 R; 410/9, 19, 22; 414/542, 543, 339, 345, 460

[56] References Cited

U.S. PATENT DOCUMENTS

| 2,471,521 | 5/1949 | Galey | 410/22 |
| 2,794,557 | 6/1957 | Vero | 414/543 |
| 3,169,012 | 2/1965 | Fagan | 280/423 A |
| 3,472,402 | 10/1969 | Priefert | 414/546 |
| 3,706,464 | 12/1972 | Burrows et al. | 280/401 |
| 3,874,719 | 4/1975 | Goyarts | 414/460 |
| 4,219,210 | 8/1980 | Genberg | 280/401 |
| 4,221,525 | 9/1980 | Stedman | 414/460 |
| 4,314,712 | 2/1982 | Owen et al. | 280/404 |

Primary Examiner—Joseph F. Peters, Jr.
Assistant Examiner—Kenneth R. Rice
Attorney, Agent, or Firm—Leonard Bloom

[57] ABSTRACT

A device for transporting logs or the like in which a two-part, trailer is carried upon a truck bed for storage, then unloaded and assembled by a log loader provided at the rear of the truck bed. The first portion of the two-part trailer includes an axle having wheels and a forwardly extending tongue which attaches to the truck bed by means of a trailer eye and hook. The second portion of the two-part trailer attaches to the first portion by means of a fifth wheel type of attachment. After use, the two-part trailer is disassembled and nested in a set, secure position upon the truck bed.

4 Claims, 6 Drawing Figures

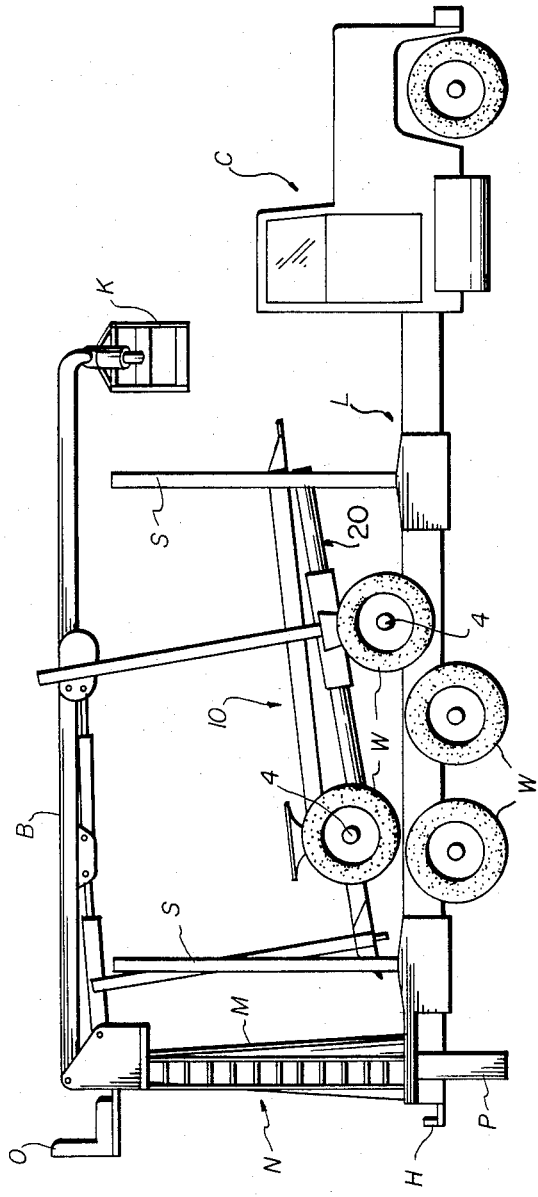
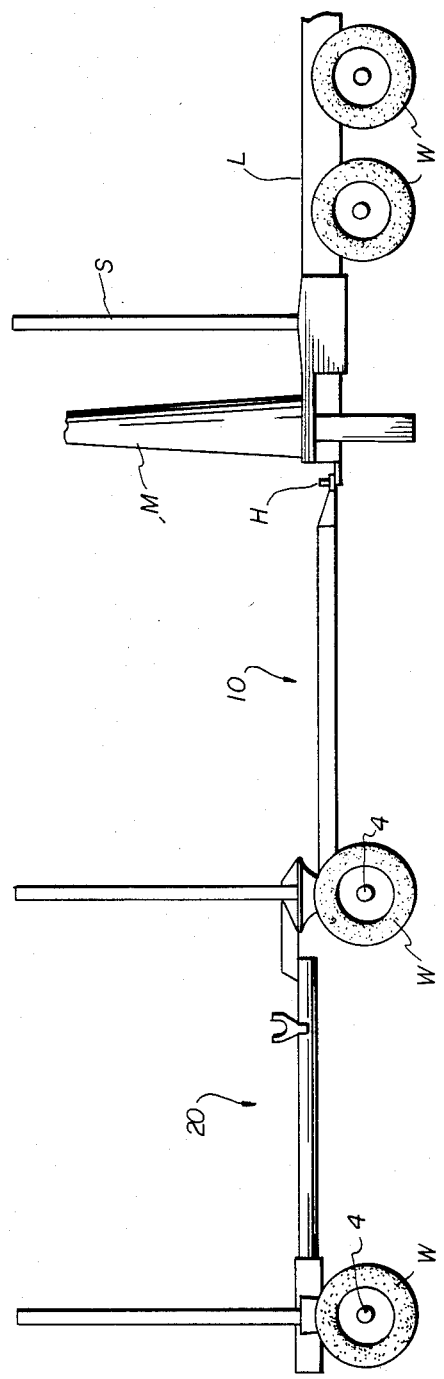

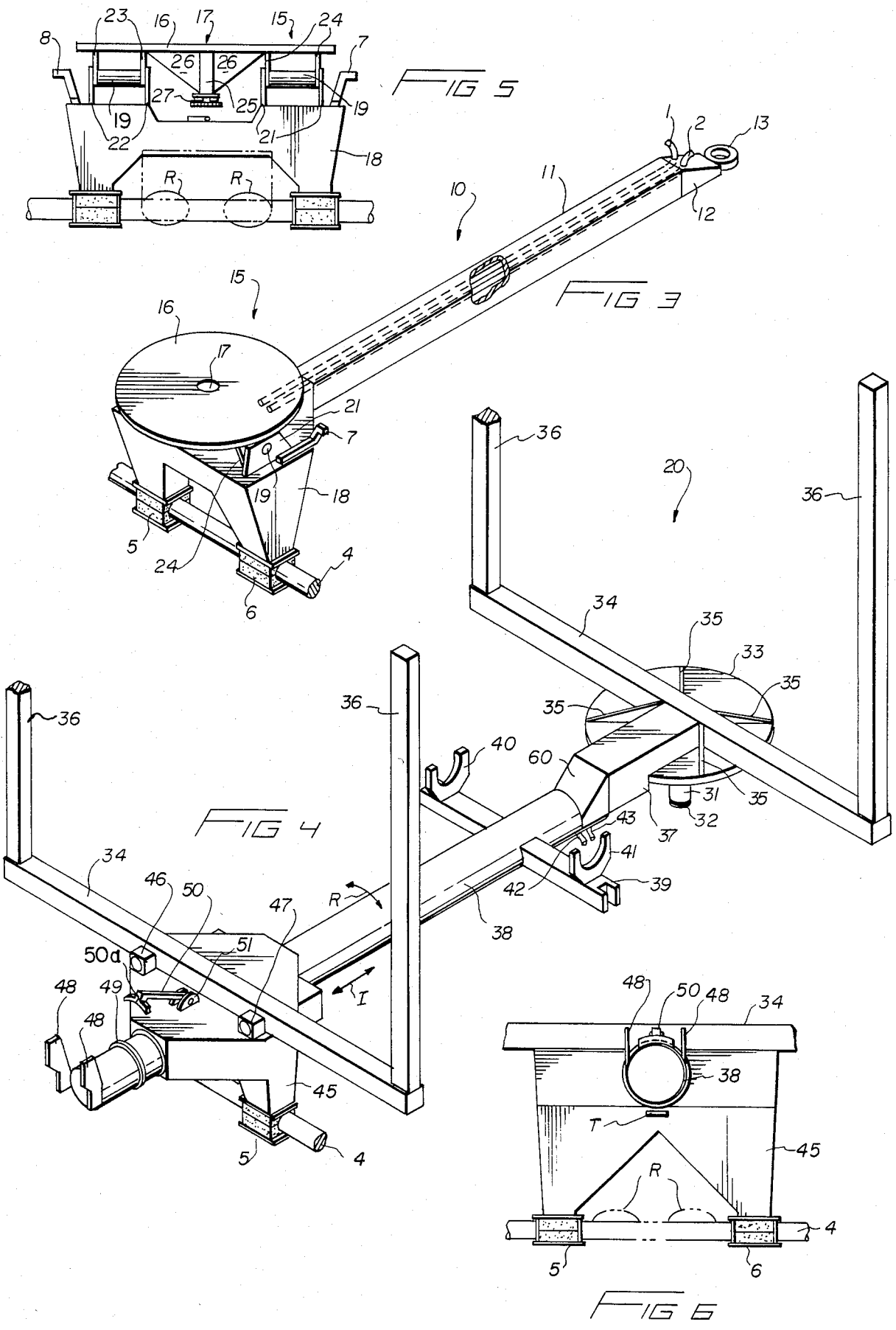

TRANSLOTOR LOG TRAILER

BACKGROUND OF THE INVENTION

This invention relates generally to trailers for hauling logs and other elongate objects.

Removing timber resources from the depths of America's forests has always presented a difficult challenge. In the past only those forest areas close to lakes and rivers could be harvested, because water was the only vehicle capable of transporting the enormous and awkward loads of timber. However, since the advent of the modern and powerful diesel equipment, logging is no longer confined to those forests areas near rivers and lakes and more remote areas have become accessible. The equipment that services these remote forest areas must be able to withstand constant punishment, because a logging road is usually so rugged and uneven that it is just barely passable. Because of the arduous nature of this transport, it is more efficient for a logging truck to haul a single large load than make two runs hauling smaller loads. These facts have long been known, and are reflected to a certain degree in the prior art.

The following patents reflect the state of the art of which applicant is aware in so far as these patents appear to be germane to the patent process:
  U.S. Pat. No. 3,874,719, Goyarts
  U.S. Pat. No. 3,472,402, Priefert
  U.S. Pat. No. 4,221,525, Stedman The patent to Stedman teaches the use of an apparatus for transporting elongated members such as logs or pipes which is suitably formed to carry logs from out of difficult terrain not having developed, adequate roadways. However, the instant invention is distinguished in that Stedman does not teach the use of a specific nesting feature for locating one trailer on top of another during transport without a payload. Furthermore, the apparatus according to the instant invention can be assembled and disassembled by a single operator employing the log loader which is integral to the apparatus.

The patent to Goyarts teaches the use of an extensible load lifting frame of the telescopic variety having a longitudinally coaxial telescopic beam structure extensible to the distance of about twice its collapsed length. The problem with this configuration is two fold. First, the inner telescoping member must be of sufficient specification to endure a heavy load, so the outer telescoping member, being larger than the inner, is of greater weight and gauge than actually required. Second, the rough and uneven logging roads cause significant torsional loading on the structural members. In the case of Goyarts this could cause significant fatigue in the structural members resulting in a inability to telescope the main beam. The instant invention is distinguished in that the two part second trailer allows significant flex because of its multi-jointed design. Furthermore, the two-part, second trailer is loaded unto the bed of the truck when not in use which saves wear and tear not only on the structural members of the second trailer but prolongs the life of the wear bearings and tires associated with the second trailer.

The remaining reference shows the state of the art further.

OBJECTS AND SUMMARY OF THE INVENTION

Accordingly, a primary object of this invention is to provide a novel apparatus for hauling logs which includes an onboard, easy to deploy second trailer that carries its own payload, thereby doubling the effective carrying capacity of the truck.

Another object of this invention is to provide a novel apparatus for hauling logs which provides a secure nesting area for the second trailer on top of a first trailer when not hauling a payload, which makes for a safer travel situation.

A further object of this invention is to provide a novel apparatus for hauling logs which is light in weight and easily assembled and attached by a single operator using a standard capacity log loader provided on the logging truck.

Still another object of this invention is to provide a novel apparatus for hauling logs which is designed with sufficient joints and flexibility to endure extreme structural punishment encountered on the remote logging roads.

Still another object of this invention is to provide a novel apparatus for hauling logs which is extremely simple to operate by a single operator, which is readily transportable to and from a point of use and which reduces the wear and tear of operational equipment.

The objects stated above and other related objects are accomplished by the provision of a two-part log trailer. The rearward portion of the trailer consists of a cylindrical structural beam with an axle and stake member slidably disposed thereupon and a fifth wheel connection fixed at a forward position on the cylindrical structural beam so that the fifth wheel connection mates with and is supported by the forward portion of the two-part trailer. The forward portion of the trailer consists of a rectangular structural beam with a mounting eye on its forward extremity to connect with the body of the logging truck and an axle assembly with a fifth wheel connection affixed to the rear extremity of the rectangular structural beam. A standard capacity log loader is provided on a rear portion of the bed of the logging truck so that the two-part trailer can be nested on the bed of the loading truck for transportation when not in use.

Other objects and advantages of this invention will become apparent from the following description when taken in conjunction with the accompanying drawings.

BRIEF DESCRIPTION OF THE DRAWING FIGURES

FIG. 1 is a side view of the logging truck with the two-part trailer nested on its bed as it would appear when being transported;

FIG. 2 is a side view of the rear section of the truck with the two-part trailer completely assembled as it would appear just prior to loading the logs;

FIG. 3 is a perspective view of the forward part of the two-part trailer;

FIG. 4 is a perspective view of the rearward portion of the two-part trailer;

FIG. 5 is an end view of the female portion of the fifth wheel connection also depicting the axle assembly provided therebelow shown in FIG. 3; and FIG. 6 is an end view of the slidably disposed rear axle and stake assembly shown in FIG. 4.

DESCRIPTION OF THE PREFERRED EMBODIMENT

Referring now to the drawings in detail wherein like reference numerals represent like parts throughout the several figures, FIG. 1 shows a logging truck consisting of a typical cab C, a load bed L with two pairs of log retaining stakes S and rear drive wheels W. Mounted on the rear of the load bed L is a hydraulic standard capacity log loader consisting of a mast M, upon the top of which is mounted a hydraulically operated boom arm B with a claw K on one end for grasping logs and loading the trailer and a seat O for the operator to control the boom. Also provided on the mast is an access ladder N and a hydraulically actuated support pedestal P, which offers support during loading operations. Also provided at the rear of the bed L is a hitch H to which the trailer attaches.

The trailer itself consists of two members which appear in their nested configuration in FIG. 1 which allows the trailer to be transported on the bed L which is a safer method of transporting the trailer and saves on wear and tear of the trailer parts when the trailer is not being used. The forward portion of the trailer generally referred to by reference numeral 10, arrives on top of the rear portion of the trailer generally referred to by the reference numeral 20 when in the non-operational mode as shown in FIG. 1. In its operational mode the two trailer segments 10 and 20 are joined together and than joined to the rear of the bed L by means of a hitch H as shown in FIG. 2.

Referring now to the trailer portions in detail, FIG. 3 shows the forward portion 10 of the trailer. The forward portion 10 of the trailer consists of an elongate, hollow, substantially rectangular beam 11 within which is rooted an electrical cable 1 and a hydraulic or air line 2 to operate respectively the taillight assembly and the hydraulic or air brakes. At the forward extremity of the beam 11 is a tapered snout segment 12 which supports a trailer eye 13 which mounts the trailer assembly to the logging truck by means of the hitch H. At the opposite end of the beam 11 is fixed the fifth wheel assembly 15 used to rotatably mount the rear section 20 of the trailer to the forward section 10 of the trailer. The female part of the fifth wheel assembly consists of a lubricated plate 16 with a centrally located aperture 17. The fifth wheel plate 16 is pivotally mounted to an axle assembly 18 by a pair of axles 19 which pivotally connect lower mounting brackets 21 and 22 extending from assembly 18 with upper mounting brackets 23 and 24 that depend from plate 16 as best shown in FIG. 5. Below the aperture 17 in the plate 16 is a cylindrical sleeve 25 which receives the shaft 31 from the male portion of the fifth wheel on the rear portion 20 of the trailer. The sleeve 25 is braced underneath and with the plate 16 by triangular web members 26. At the bottom of the cylindrical sleeve 25 is a locking tab 27 which engages a locking groove 32 of the fifth wheel shaft 31. The axle assembly 18 is essentially an inverted U-shaped solid with the fifth wheel assembly 15 on the top thereof and the front trailer axle 4 captured on the bottom thereof by means of two axle clamp bearing mechanisms 5 and 6. FIG. 1 shows the axle 4 carrying a wheel W. Also affixed to the top surface of the axle assembly 18 are two support brackets 7 and 8 appearing on either side of and proximate to the fifth wheel assembly. The support brackets 7 and 8 are used to cooperate with the tines of the claw K when removing and replacing this trailer portion 10 on the bed L using the boom B. The support brackets include a base section supported on assembly 18, an upwardly and outwardly splayed medial segment which terminates in a horizontal tip.

Pneumatic reservoirs R shown in phantom in FIG. 5 can be mounted on the axle 4 to actuate the brakes in the trailer wheels W. The rear portion 20 of the trailer is joined to the forward portion 10 of the trailer by means of a fifth wheel assembly 15 as described previously. The fifth wheel shaft 31 is centrally and dependantly affixed to another fifth wheel plate 33 which mates in a plane with and overlies the other plate 16 located on the forward portion 10 of the trailer. The tangent faces of these two plates 16 and 33 are lubricated and coact with one another to provide a flexible linking assembly, so that the portions of the trailer can articulate during cornering and flex to the contours of a rugged logging road. The top fifth wheel plate 33 depends from a cross-beam 34 and is further supported by four overlying triangular web members 35. On either end of the cross-member 34 is a vertical stake 36 which acts as a cradle for the logs which are loaded onto the trailer. The cross-member 34 and the upper fifth wheel plate 33 are further affixed to a trailer tongue 37 which connects to a cylindrical structural beam 38 that forms the backbone of the second portion 20 of the trailer. Just to the rear of the tongue 37 which is welded to the cylindrical beam 38 and horizontally offset therefrom but linearly aligned through tapered transition member 60 is an axle nesting cradle 39 which is affixed to the cylindrical beam 38 in such a configuration that the two upwardly open ended U-shaped cradle members 40 and 41 are positioned to received the axle 4 of the front portion 10 of the trailer when both portions of the trailer are loaded onto the bed L of the logging truck in the nested or non-operational mode. Just below the tongue member 37 are two tubes 42 and 43 to receive the electric cable 1 and the hydraulic or air cable 2 and provide a passageway for them to proceed to a rear axle assembly 45 and to two taillights 46 and 47 through a "T" fitting. The rear axle assembly 45 is slidably mounted on the cylindrical beam 38 to not only move in the direction of the arrow I, but also rotate in the direction R. The end of the cylindrical beam is provided with two stops 48 to prevent the rear axle assembly from sliding off the end of the cylindrical beam 38.

An annular ring 49 appearing at the end of and upon the cylindrical beam 38 coacts with a locking arm 50 having an arcuate locking segment appearing on the top surface of the axle assembly 45 to lock the axle assembly 45 in a fixed position axially on the cylindrical beam 38 while still allowing some rotation about R. The locking arm 50 is pivotally supported on a pivot arm placed between two mounting tabs 51. Also affixed to the top surface of the rear axle assembly 45 is another cross-member 34 with two vertical stakes 36 which form the rearmost part of the log cradle.

The fact that the rear axle assembly 45 is slidably and rotatably mounted on the cylindrical beam 38 allows a certain amount of flex so that when a pair of wheels W carried on axle 4 encounters rough contour on the road there is enough articulation of the rear axle assembly 45 around the cylindrical beam 38 to prevent an unnecessary torsional loading on the cylindrical beam 38. This is essentially because this location is usually the site of any fatigue that may be experienced by the structural members of a trailer which heretofore have been addressed by complex suspensions. The rear axle assembly 45 is substantially an inverted V-shaped solid in vertical section having an octagonal top face with similar axle bearing clamps 5 and 6 as shown in FIG. 6 as appeared in the forward axle assembly 18. These clamps 5 and 6 also capture an axle 4 which supports the rearmost trailer wheels W.

Thus in operation the operator mounts the mast M by means of the ladder N, and takes his position O in back of the boom B. He extends the support legs P and uses the claw K on the boom to grasp the first section 10 of the trailer. The support brackets 7 and 8 on the body of the first trailer section 10 allow the tines of the claw K to get a good purchase for lifting. The first section of the trailer 10 is then lifted out of the bed L of the truck and placed behind the bed of the truck and joined to it by means of the hitch H and the hitch eye 13. Once this is accomplished, the operator then turns the boom back and graps the second section 20 of the trailer. The second portion 20 is deployed behind the first portion 10 in such a manner that the fifth wheel shaft 31 engages the fifth wheel aperture 17 falling into the sleeve 25 so that a secure connection is provided by the locked tab 27. At this point the trailer is ready to be loaded as is the bed of the truck. Afte the logs have been unloaded the reverse procedure is used. The rear portion 20 of the trailer is placed on the bed L of the truck. Then the first portion of the trailer 10 is placed on top of it so that the axle 4 is cradled in the cradle brackets 40 and 41 which provide the nesting area for the piggyback configuration.

Having thus described the preferred embodiment of the invention, it should be understood that numerous structural modifications and adaptations may be resorted to without departing from the spirit of the invention.

What is claimed is:

1. A trailer for increasing the payload of a truck which is adapted to carry elongate articles such as logs, pipes or the like and is stored on said truck when not in use comprising, in combination:
   a forward trailer segment attached to a rear portion of said truck,
   a rearward trailer segment attached to a back portion of said forward trailer,
   means on a trailing portion of said truck for placing first said rearward and then said forward trailer segments on and off said truck and to load and unload said truck and trailers of their payload, and means for nesting said forward trailer segment and said rearward trailer segment,
   wherein said nesting means comprises a wheeled axle on said forward trailer segment and cradle members on said rearward trailer segment dimensioned to receive said forward trailer axle,
   wherein said rearward trailer segment includes an axle assembly slidably and rotatably disposed about and along the length of said rearward trailer segment to respectively provide nesting clearance during storage and a rear suspension system,
   wherein said rearward trailer segment axle assembly includes locking means to limit relative sliding motion when in use,
   wherein said forward trailer segment includes a support means graspable by said placing means which includes a tined claw on the truck for placement of said forward trailer between a stored and used position,
   wherein said forward trailer segment includes a fifth wheel extending up from an axle assembly which carries said wheeled axle, said fifth wheel pivot thereto and adapted to attach to said rearward trailer segment,
   including a support beam extending forwardly of said forward trailer axle assembly and having a latching eyelet at a leading end thereof, said latching eyelet adapted to connect to a hitch on the truck,
   wherein said rearward trailer segment includes a forward fifth wheel assembly adapted to connect to said fifth wheel of said forward trailer segment, a rearwardly extending substantially cylindrical support beam upon which said axle assembly is disposed, said axle assembly and said fifth wheel supporting cross-beams transverse to said cylindrical support means having vertically extending posts to form log cradles,
   wherein said locking means extends between said axle assembly to said support beam and includes a pivoted locking arm on said axle assembly engageable on a ring on said beam,
   including electrical and hydraulic conduits extending rearwardly of the truck and carried on said trailers to operate respectively lights and brakes,
   wherein said fifth wheel of said forward trailer includes a central bore defined by a depending cylindrical sleeve reinforced to a bottom face of said forward trailer fifth wheel,
   said axle assembly of substantially inverted U shaped configuration having bearing means to fix said axle thereto,
   brackets on both said U shaped axle assembly and said fifth wheel facing each other and interleaved, interconnected by axles between said brackets to provide articulation of said fifth wheel thereabout.

2. The device of claim 1, wherein said fifth wheel of said rearward trailer segment includes a shaft depending from a bottom face thereof dimensioned to be received within and locked in said cylindrical sleeve of said forward trailer fifth wheel.

3. The device of claim 2, wherein said rearward trailer axle assembly is an inverted substantially V shaped solid member having an octagonal top face and bearing means on lowermost ends carrying said axle, said cylindrical beam passing through said top face, and a pair of support brackets on a top face of said U shaped axle assembly to be grasped by said placing means, said support brackets including a base section and upwardly and outwardly splayed top portions.

4. The device of claim 3, wherein said cradle members are formed from an axle extending transversely from said cylindrical beam on diametrically opposed horizontal portions thereof, and upwardly extending U shaped members on said cradle axle dimensioned to receive said axle of said forward trailer during storage.

* * * * *